(12) United States Patent
Del Core (10) Patent No.: US 9,827,871 B2
(45) Date of Patent: Nov. 28, 2017

(54) ADAPTIVE THERMAL MANAGEMENT OF AN ELECTRIC ENERGY STORAGE METHOD AND SYSTEM APPARATUS

(71) Applicant: Robert Del Core, San Diego, CA (US)

(72) Inventor: Robert Del Core, San Diego, CA (US)

(*) Notice: Subject to any disclaimer, the term of this patent is extended or adjusted under 35 U.S.C. 154(b) by 542 days.

(21) Appl. No.: 14/035,482

(22) Filed: Sep. 24, 2013

(65) Prior Publication Data

US 2014/0091772 A1 Apr. 3, 2014

Related U.S. Application Data

(60) Provisional application No. 61/704,891, filed on Sep. 24, 2012.

(51) Int. Cl.
*B60L 11/18* (2006.01)

(52) U.S. Cl.
CPC ....... *B60L 11/1874* (2013.01); *B60L 11/1875* (2013.01); *B60L 2240/545* (2013.01); *B60L 2240/547* (2013.01); *B60L 2240/549* (2013.01); *B60L 2240/662* (2013.01); *Y02T 10/7005* (2013.01); *Y02T 10/705* (2013.01); *Y02T 10/7291* (2013.01); *Y02T 90/16* (2013.01)

(58) Field of Classification Search
CPC .......................... B60L 11/1874; B60L 11/18
USPC .......................................................... 320/136
See application file for complete search history.

(56) References Cited

U.S. PATENT DOCUMENTS

| | | | | |
|---|---|---|---|---|
| 5,623,232 | A * | 4/1997 | Halbert et al. | 330/307 |
| 5,698,967 | A * | 12/1997 | Baer et al. | 320/152 |
| 7,786,702 | B1 * | 8/2010 | Chait et al. | 320/145 |
| 7,821,282 | B2 * | 10/2010 | Kurahashi et al. | 324/764.01 |
| 2003/0118891 | A1 * | 6/2003 | Saito et al. | 429/62 |
| 2004/0128086 | A1 * | 7/2004 | Barsoukov et al. | 702/63 |
| 2010/0256864 | A1 * | 10/2010 | Ying | 701/33 |
| 2010/0290386 | A1 * | 11/2010 | Cabral Hinojosa et al. | 370/315 |
| 2011/0210703 | A1 * | 9/2011 | Souza et al. | 320/136 |
| 2012/0028087 | A1 * | 2/2012 | Gaben et al. | 429/50 |
| 2014/0034288 | A1 * | 2/2014 | BUFORD et al. | 165/287 |
| 2014/0091772 | A1 * | 4/2014 | Del Core | 320/136 |

* cited by examiner

*Primary Examiner* — Richard Isla Rodas
*Assistant Examiner* — Dung V Bui (57) ABSTRACT

A system, method, and computer-readable storage medium to dynamically manage heat in an electric energy storage system, such as a battery pack or ultra-capacitor pack system in an electric vehicle.

19 Claims, 12 Drawing Sheets

ADAPTIVE THERMAL MANAGEMENT OF AN ELECTRIC ENERGY STORAGE METHOD AND SYSTEM APPARATUS

RELATED APPLICATIONS

This application claims priority to U.S. Provisional Application No. 61/704,891, filed on Sep. 24, 2012, incorporated by reference herein in its entirety.

BACKGROUND

Field of the Disclosure

Aspects of the present disclosure relate to a system, method and device to dynamically manage heat in an electric energy storage system, such as a battery pack or ultra-capacitor pack system in an electric vehicle.

Description of the Related Art

Electric powered vehicles for transportation offer reduction of harmful emissions in our environment, improved fuel economy and strengthened security of energy supply. It is well known in prior art that an electrical energy storage system is required to power electric vehicles. Other components that make up the rest of the drive system include traction motor(s) interfaced to the vehicle wheel system, high and low voltage power electronics, electrically powered accessories, system controls and vehicle interface.

Energy storage systems are created with a plurality of energy storage cells connected electrically to form a stack or module of cells configured in series or parallel to provide power and energy required for an application. Energy storage cells are typically battery cells. Depending on the power and energy granularity of the stack, there are stacks electrically connected in a system. In use under a typical charge/discharge duty cycle, the battery cells produce heat which must be controlled in order to maximize life of the elements and minimize the risk of thermal runaway. To optimize the safety, reliability, performance, active thermal management systems are often incorporated into the energy storage system. Active thermal management is generally accomplished by circulating a heat exchange fluid such as air or liquid or other media, using integrated HVAC units, or hybrid internal air circulation in conjunction with a water based chiller system, or Peltier thermal electric systems. Any HVAC system that is capable of adding or removing sufficient heat to an energy storage cell can be used with this present embodiment. Examples of different cooling circuit topologies in prior art used for thermal conditioning include liquid cooling loops to liquid air heat exchanger, air circulation, internal air circulation with air/water heat exchanger, dual cooling loops connected via a water heat exchanger are some commonly used topologies.

Prior to use, a battery system is thermally conditioned to some temperature value within the battery cell manufacturer's prescribed temperature range. Battery thermal preconditioning can be accomplished with logic that observes the ambient temperature during grid connected charging or charging from another source. The HVAC system draws power from the grid to heat the battery to an optimal temperature before charging begins. In cases when ambient temperatures are higher than the manufacturer's range, the charge control logic can cool the battery pack to desired levels before charging commences. For example, under charging scenario with low ambient temperatures, the vehicle's charge controller logic can activate a heating system interfaced to heat exchanger (4) via communication boundary (7). Under charge, pump (3) circulates fluid heated by the HVAC system connected to heat exchanger (4). In an alternate configuration an in line immersion heater is commonly incorporated into the thermal loop with various flow control devices. Prior art extends this concept to the occupants cabin of the vehicle, where pre-heating of the interior and pre-cooling of the interior is performed during charge to maximize drivers and passenger comfort and maximize vehicle range. Once the battery is preconditioned, the embodiment can be used to condition the battery if the vehicle is participating in a vehicle to grid application, or "V2G", where the load center is the grid instead of the traction motor.

As an ESS is charged and discharged during use, heat is generated in the battery cells due to the cells internal resistances which ultimately results in a rise of temperature. If the heat is not rejected sufficiently fast or if the battery is allowed to operate outside of specified limits the battery will suffer reduced life, efficiency and performance, and ultimately fail. An active thermal management system is generally required to control the temperature so as to maintain the cell temperatures within an optimal temperature range. The optimal temperature range is normally prescribed by the energy storage cell manufacturer. Power is required to run the HVAC system which impacts the overall driving range and efficiency of the electric vehicle.

It is well known that battery life and capacity is extremely sensitive to temperature, requiring that the battery cells be operated within a well-defined temperature band. Conventional systems monitor every cell in a battery pack which increases packaging complexity and cost, and potential failure points. In addition, control methods have logic algorithms that are based on conservative threshold approach where corrective actions are based on readings that approach preset levels, which often result in an overshoot of target temperatures requiring aggressive compensation from the thermal management system, thus a reduction in efficiency. Such methods present the risk that operating limits are exceeded thus presenting a warranty issue with the battery cell supplier, reduced battery life, excess balancing required from the BMS due to thermal imbalances and swings.

SUMMARY

Embodiments include a system, device, method and computer-readable medium to dynamically manage heat in an electric energy storage system.

In one embodiment, an apparatus comprises an energy storage system and a thermal management system. The energy storage system with an energy storage module connectable to a load. The thermal management system for regulation of operating temperature within limits prescribed by a battery manufacturer. The thermal management system is configured to an input signal measuring a parameter indicative of current drawn from a battery, to receive an input signal measuring a process parameter of cell temperature useful in the operation of the thermal management system, to receive an input signal measuring a process parameter of ambient temperature for operation of the thermal management system, to receive an input signal from a control device that requests current be drawn from the battery at a specific time, at a specified current, and to output the allowable current to be drawn to a vehicle controller.

In some embodiments, the input and output signals are discrete.

In some embodiments, the apparatus is connectable to an existing communication control network without modification of other devices on that control network.

In some embodiments, the apparatus may further comprise a computation device to compute an averaged current from the energy storage system, and a storage device to store a computed value to be used in calculating a temperature setpoint.

In some embodiments, the computation device is further configured to compute a partial differential transient heat equation for the generation of control signal.

In some embodiments, the computation device is further configured to compute a multidimensional transient heat/energy equation which may also include a numerical representation of the entire thermal management system connected with the energy storage system for the generation of a control signal In another embodiment, the computation device is further configured to compute a system of partial differential continuity, momentum and energy equations representing the energy storage system and the thermal management system for the generation of a control signal.

In some embodiments, the apparatus further comprises an actuator in the form of a dry contact, PWM signal generator, or relay center, that interfaces to the vehicle HVAC system and commands the vehicle HVAC system.

In some embodiments, the temperature setpoint is determined by the control expression, $$t\_set\_point = t\_setpoint\_max - M*((I\_AVG*\alpha + (1-\alpha)*I\_CDR)^2 * R\_Internal/(A*(I\_AVG*\alpha + (1-\alpha)*I\_CDR)^B * Acell))$$

where, t_setpoint_max= is the maximum setpoint of the system HVAC in accordance with an embodiment;

M is a parameter determine a mapping function that maps allowable temperature rise to maximum and minimum;

I_avg is the average current of the battery duty cycle;

Alpha is a weight parameter;

R_internal is battery internal resistance which can vary with the discharge depth and cell temperature;

A is a cross sectional area of a battery cell; and,

B is a width of the battery cell.

In some embodiments, M is determined by a mapping function that maps allowable temperature rise to maximum and minimum set points in an inverse manner by a linear function.

In some other embodiments, the M is determined by a mapping function that maps allowable temperature rise to maximum and minimum set points in an inverse manner by a higher order polynomial function.

In some embodiments, the Iavg is computed using a time average value of actual current the electrical energy storage system is delivering over a tunable preset time interval.

In some embodiments, the requested current is used to compute the temperature setpoint.

In some embodiments, a function in the form of $K\alpha + (1-\alpha)K$ is used to weight the average current and a requested current to compute a weighted average current with weight $\alpha$, such that $\alpha$ is a number between 0 and 1.

In some embodiments, the $\alpha$ a function of the energy storage state of charge or $\alpha = 1 - SOC$.

In some embodiments, temperature rise for generating time dependent boundary conditions for a 1 dimensional numerical model of the battery and cell and surrounding structure is given by a temperature rise relation $I^2R/AI^BA$-cell, where I(t) @ t=t+dt is found by interpolation between the current request points I(t) @ t=t and I(t) @ t=t+dt In some embodiments, the a one dimensional time dependent partial differential heat equation is numerically solved to obtain a virtual average cell temperature using a one dimensional model of the cell, thus reducing the number of required sensors in the battery array In some embodiments, a multidimensional partial differential equation of continuity, momentum and energy is numerically solved to obtain a virtual cell temperature using a geometric model of the cells, module, and system, thus reducing the number of required sensors in the battery array.

In some embodiments, the a partial differential equation solution is compared with T_Actual to determine cells are within temperature limits, and issue a current rate to some pre-set value determine by the invention In some embodiments, the tcell and tpde are compared to determine SOH as time progresses, issuing a diagnostic message if the difference grows beyond bound.

In some embodiments, the energy storage system and thermal management system are included in a vehicle.

In some embodiments, the adaptive thermal management control (ATMC) unit is included in the overall system controller of an electric vehicle.

In some embodiments, the adaptive thermal management control unit is a standalone device but included in the overall vehicle In some embodiments, the controller includes a high performance numerical computation unit such as a CPU, FPGA, ASIC, GPU, DSP or plurality of this computation units in parallel.

In some embodiments, the Max_temperature_rise@C (rated C) is given by $$\text{Max\_temperature\_rise} = I^2 R\text{internal}/(AI^B)A\text{cell}$$

where A, B, Rinternal and Acell are properties of the cell and energy storage cell assembly and in the present disclosure=22 degrees C.

In some embodiments, the Max_temperature_rise @ C is determined by lookup table, 22 degrees C.

DETAILED DESCRIPTION

One aspect of the disclosure pertains generally to the field of thermal management systems for an electric energy storage system such as a battery pack or ultra-capacitor pack system for use in an electric vehicle. In particular, an aspect relates to a method of efficiently controlling the temperature of an electric energy storage system in an electric vehicle.

An application of this disclosure also pertains to electrical energy storage thermal management method for electric vehicles such as automobiles, light duty commercial vehicles, heavy duty commercial vehicles such as transit buses, material handling equipment such as port cranes, trucks and forklifts that utilize an electric energy storage system such as batteries, ultra capacitors or combinations thereof. In addition, the embodiment also applies to other non-mobility applications such as grid energy storage, remote power and backup power systems, and wind turbine power generators for pitch control and line power stabilization to name a few. In particular, this embodiment has great applicability in the field of electric vehicle energy storage thermal management where high duty cycles are typically encountered.

Another aspect of the disclosure includes the realization that active thermal management systems should be extremely efficient since they present themselves to the overall drive system as a significant parasitic load. Overall range of the electric vehicle can be reduced since they consume a great deal of energy. Consequently, embodiments of the disclosure include: 1) an efficient system, method and apparatus for maximizing the life of a battery pack without increasing cost 2) and efficient system, method and apparatus that maximizes overall electric vehicle range by predicting the anticipated set point required for thermal management, actuating a device in a manner that tracks the overall duty cycle of the vehicle and 3) a system that allows for the reduction of battery temperature sense hardware and associated wiring. The present embodiment provides such a method. In addition, depending on the duty cycle, battery temperatures can continue to rise for a short period of time even once the battery current has been cut or reduced.

The embodiments include a communication interface, a processor and an actuator. The method includes acquiring a plurality of values based on an operating profile and parameter values that are indicative of current, and setting operating value thresholds. In the present embodiment, the thermal management system setpoint is determined as a function of battery pack current and/or battery pack current draw request and time averaged battery current. Battery temperature rise is determined with a relation in the form of $I^2R = hAdt$, where:

I is the battery current.

R is the internal resistance of the battery, which may vary with the State of Charge (SOC), State of Health (SOH) and other battery cell properties.

h is a heat transfer coefficient, a property of the cell and cell package superstructure inside the battery module.

A is the cell cross sectional area of the cell.

dT is the associated rise in temperature under charge and discharge current during operation.

Manufacturer cell data of the chemistry and package and/or a first principle model of the cell may be used dynamically in real time to characterize the cell used in the application. Dynamically solving a battery chemistry model is another embodiment of the present embodiment.

In the current embodiment, a temperature rise equation is constructed using the following form:

$$\text{temperature\_rise} = y_{int} * y_{int} * R_{internal} / ((A y_{int} ** B) A cell))$$

Other forms of this equation are possible. In another embodiment, a first principle model of the cell that characterizes the physical and electrical properties of the cell, this describing heat rise can be solved in real time within the apparatus to compute the result in the above expression.

Dynamically solving a multidimensional system of partial differential equations describing continuity, momentum and energy relations for the energy storage system, thermal system, and combination of energy storage system and thermal system is another embodiment of the present embodiment.

Current data as a function if time I(t) from either the vehicle simulation or real world data is used as input to the above equation to analytically determine temperature rise as a function of time.

In the current embodiment the control rule is developed by way of the following process:

a. Identify the maximum temperature rise for the specific cell chemistry. A source of this information can come from manufacturer's test data, physical tests conducted by a third part familiar in the art of energy storage cell testing, or a verified and calibrated first principle model that can accurately predict the temperature response of a cell to within some pre-established acceptable tolerance b. As an illustration, the maximum temperature rise based derived from manufacturer data. For illustrative purposes given the manufacturer cell data, temperature rise ranges from 0 degrees Celsius at 0 C charge rate to 22 degrees Celsius at 4.5 C charge rate, or maximum allowable charge rate.

c. Temperature operating limits based on the cell manufacturer's usage recommendations are established. In this present embodiment, the battery system will be operated between 30 and 15 degrees C. Other ranges are possible, depending on the cell characteristics and manufacturer.

d. For maximum cell temperature rise, the thermal conditioning system must provide maximum cooling. For example, the maximum allowable temperature rise is 22 degrees. As such the corresponding setpoint is 15 degrees C. When max temperature rise=0 max set point is 30, or off. In general, the method of determining the operating band can be tuned to the specific cell chemistry in use.

e. A mathematical function that maps temperature rise limits to setpoint limits, such that when cell temperature rise is 22 degrees, setpoint is 15 degrees is determined. In the present embodiment, the function is linear, but higher order polynomial functions are possible. If a nonlinear response in (y) is desired, such as may be required to address nonlinear control of some vehicle HVAC systems, other regression techniques that utilizes higher order polynomials can be employed. A function is determined that maps onto a range of set points bounded by the setpoint limits.

Using rules of functions, relations and the condition of temperature rise=0, setpoint=30:

$$@x=0, y=b=30, m=\text{rise/run}, m=-(15/22)=-0.6808$$

Therefore the mapping function is: y=30−0.6808x

By analogy, 30 is the highest setpoint, m is −0.6808. This value is fixed for the required cooling range. One aspect, the temperature setpoint is determined in real time at each time interval according to the following rule:

$$t\_setpoint = t\_setpoint\_max - M*((I\_avg*alpha + (1-alpha)*I\_cdr)**2*R\_internal/A* (I\_avg*alpha+(1-alpha))**B*Acell)$$

$$t\_set\_point = t\_setpoint\_max - M*((I\_AVG*\alpha + (1-\alpha)*I\_CDR)^2 * R\_Internal/(A*(I\_AVG*\alpha + (1-\alpha)*I\_CDR)^B * Acell))$$

where:

T_setpoint is the computed setpoint of the HVAC system in order to optimally control the battery;

T_setpoint_max= is the maximum setpoint of the system HVAC in accordance with an embodiment;

M a parameter determine by the method above. In the current example, the result is computed as M=−0.6808;

I_avg is the average current of the battery duty cycle. In this example, we define a moving average of 10 seconds. Other durations are possible, and can be tuned for optimal performance.

Alpha is a weigh parameter, alpha=0.2 in this example as determined by the duty cycle, alpha is a number from [0:1];

R_internal is battery internal resistance, function of cell properties and can be adjusted to reflect ESR from mechanical connections.

In this aspect of the embodiment there is no need for complex conditional logic or override functions. The user can implement but it is not required. In another aspect specific to this embodiment a hybrid function of the type K*I+(1−K)Ibar, where K is a number between 0 and 1. Using instantaneous current for setpoint computation only results in over compensation of cooling. Using current average only smooths our transients which results in a lack of cooling performance. Use of the tunable hybrid scheme, which as one aspect of this embodiment provides the optimal thermal regulation for control of the battery.

The computed setpoint is compared with t_v_sensor and t_cell_actual. In the present embodiment, t_cell_actual is the physical reference temperature sensor and placed in particular at every fourth cell in the module, thus reducing the overall number of sensors required for monitoring. T_v_sensors is a virtual thermistor or temperature sensor determined by computation and solution of a computation heat transfer equation in the overall controller. This allows for a reduction of sensors and also a mechanism for verifying when calibration is required. By plotting the difference between the reference temperature and the numerical cell temperature is an indication of the overall state of health of the battery which can be communicated as diagnostic information to the overall system controller for analysis. The heat equation that is solved is in the following form:

$$\frac{\partial T}{\partial t} = k \frac{\partial 2T}{\partial x2}.$$

In another embodiment, the heat equation is solved in multidimensional form

In another embodiment, the equations of mass, momentum and energy are solved in multidimensional form Using a reference cell temperature and numerical cell temperature, reconstructed with the use of a the numerically solved partial differential equations configured to represent the physical system and solve in real time the transient heat equation, allowing the simplification or reduction of thermal sensors For the purpose of illustrating the embodiment, the HVAC system that interfaces to Heat Exchanger (4) is sufficiently sized to remove or add the required heat into the thermal circuit. Based on the cell manufacturer's data, temperature operating limits will be taken to be between 15 and 30 degrees C. The battery can be pre-cooled or pre-heated while charging from the electrical grid.

In the following text, "battery", "cells" are used to refer to a variety of energy storage chemistries that include all lithium based cell technology, lithium ion capacitors, EDLCs, NiMH batteries, Zinc, or any other. "Battery modules" are a plurality of cells electrically connected to each other, in an envelope that contains the plurality of cells. Cells can be of a variety of form factors such as cylindrical, pouch or prismatic. "Battery pack" is a plurality of modules electrically connected in series and/or parallel. "Energy Storage System" or "ESS" is used to refer to the entire battery pack assembly that has the ability to be charged and discharged for the purpose of powering an electric vehicle.

The embodiments include a communication interface, a processor and an actuator. The method includes acquiring a plurality of values based on an operating profile and parameter values that are indicative of current, and setting operating value thresholds.

The embodiments contain a control unit to thermally regulate an electrical energy storage system, including 1) actuation of contactors to connect the energy storage system to a load or power source such as the utility grid or an auxiliary power unit and 2) to limit current drawn from the energy storage device if temperature limits are exceeded.

According to one embodiment, an apparatus is used to thermally regulate and operate an electric energy storage module. Such a device may comprise, a measurement device or input signal for measuring a parameter such as battery current or parameter indicative of the load, or in units of Amps or operating profile;

a calculation device to compute expected temperature rise of the cell in the system in response to a load or anticipated load;

a calculation apparatus to compute the one dimension partial differential heat equation to determine the average cell temperature which is used in operation and thermal regulation of the energy storage system;

a calculation apparatus to compute a multidimensional partial differential mass, momentum and energy equations to determine the average cell temperature which is used in operation and thermal regulation of the energy storage system an apparatus to compute and memory device to store a time average value of the load over a user configurable time period;

whereas the stored time average value is used to compute a temperature setpoint for efficient thermal regulation;

whereas the measured process parameter indicating load is used to compute temperature setpoint;

whereas the theoretical temperature rise of the cell due to current drawn is used to compute a temperature setpoint for efficient thermal regulation of the energy storage system.

Another aspect of the embodiment is the method comprising:

measuring the process parameter indicative of the load on the energy storage system;

measuring a process parameter indicative of the load that will be requested from the energy storage system;

measuring a process parameter indicative of the ambient temperature;

computing an average value based on the process parameter indicative of the load on the energy storage system;

computing a control rule that is a function of the battery parameters and the process parameters that are indicative of the load on the energy storage system and the load that will requested of the energy storage system before a return command indicating the allowable current draw to the system within the time period and activating a thermal management system to thermally condition the fluid within the required setpoint;

solving a partial differential equation within the apparatus control unit for the determination of the average cell temperature signal for read back and control;

determining if the average cell temperature is within allowable limits and if so issue a signal allowing the requested current be drawn; and, determining if the average cell temperature is within allowable limits and if not issue a command to limit the allowable current that can be drawn in accordance with to the temperature rise term equation. (i.e. if the battery is at temp X, allowable temp rise is LIMIT-X, then back out the allowable current based on table lookup.

The method and apparatus may be incorporated into the energy storage package or be embodied in a stand-alone control system, and includes activating the control of a thermal conditioning device based on sampled input signals such as duty cycle current, reference cell temperatures, and the solution of a transient partial differential heat equation that represents the properties of the energy storage cell assembly. The embodiment can be also be applied under "fast charge" scenarios where charge rates are in excess of 1 C resulting from overnight charge to refill the vehicle's energy store, or from rapid acceleration and regeneration scenarios as part of the vehicles normal operation in use. The energy storage system in an electric vehicle such as a heavy duty transit bus, may contain a battery, ultra capacitor, or combination thereof. The energy storage system generally contains a plurality of electrochemical or electrostatic elements for the acceptance, delivery, and storage of electric power.

Figure 1:
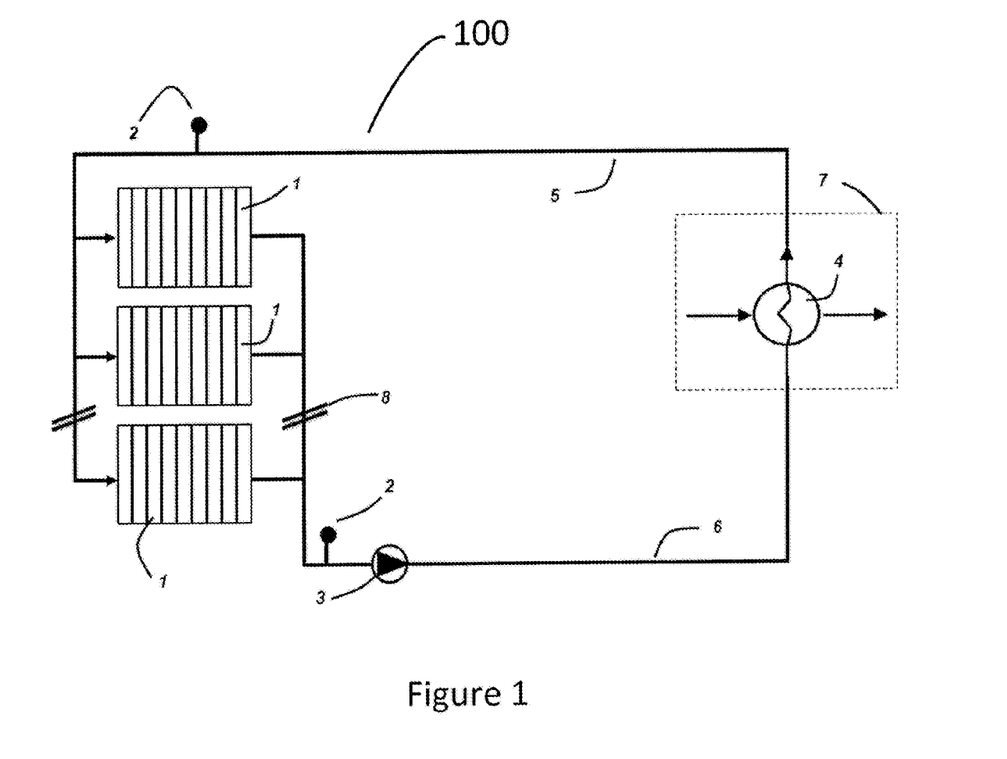
FIG. 1 is an illustrative schematic that is useful in describing the present embodiment and is a schematic of an exemplary thermal management system.

Reference FIG. 1 which is an illustrative schematic which depicts a thermal management loop used to heat or cool and electric energy storage system, and is useful in describing the embodiment. Battery Modules (1) comprise battery cells connected electrically to each other are shown (1). A cooling or heating fluid or gas which provides thermal conditioning is circulated through the battery modules and pipe system (5) and (6) in a closed loop. Pump (6) provides the means of circulating the fluid through the network. The thermal loop is hydraulically configured in parallel as shown to minimize the buildup of thermal gradients and also minimize pumping losses. Sensors (2) upstream and downstream of the battery modules are used for purposes of diagnostics and control. Heat is transferred to and from the thermal management loop in FIG. 1 via heat exchanger interface (7). Any device or system that is capable of adding and/or removing heat can be shown to connect with interface (7). These devices include, but are not limited to: fans, radiators, thermoelectric generators, refrigeration units or other. In operation, battery energy storage systems lose capacity with low temperature. If required the energy storage system can be pre-conditioned before use while charge connected to the grid to insure optimal re-charge conditions and that fully capacity is attained. Method's operating band can be tuned to fit the chemistry.

Figure 2A:
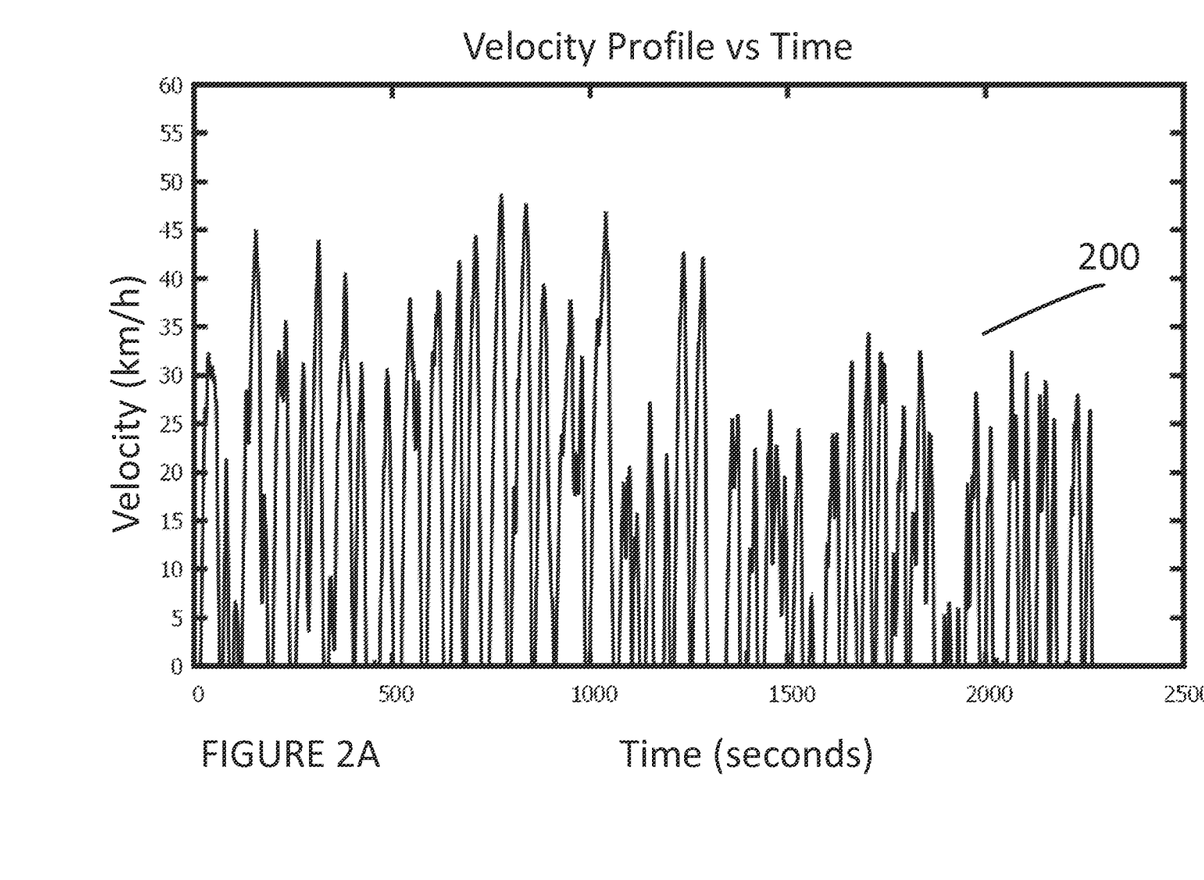
FIG. 2A graphically illustrates a typical drive schedule plot of vehicle velocity verses time.
Figure 2B:
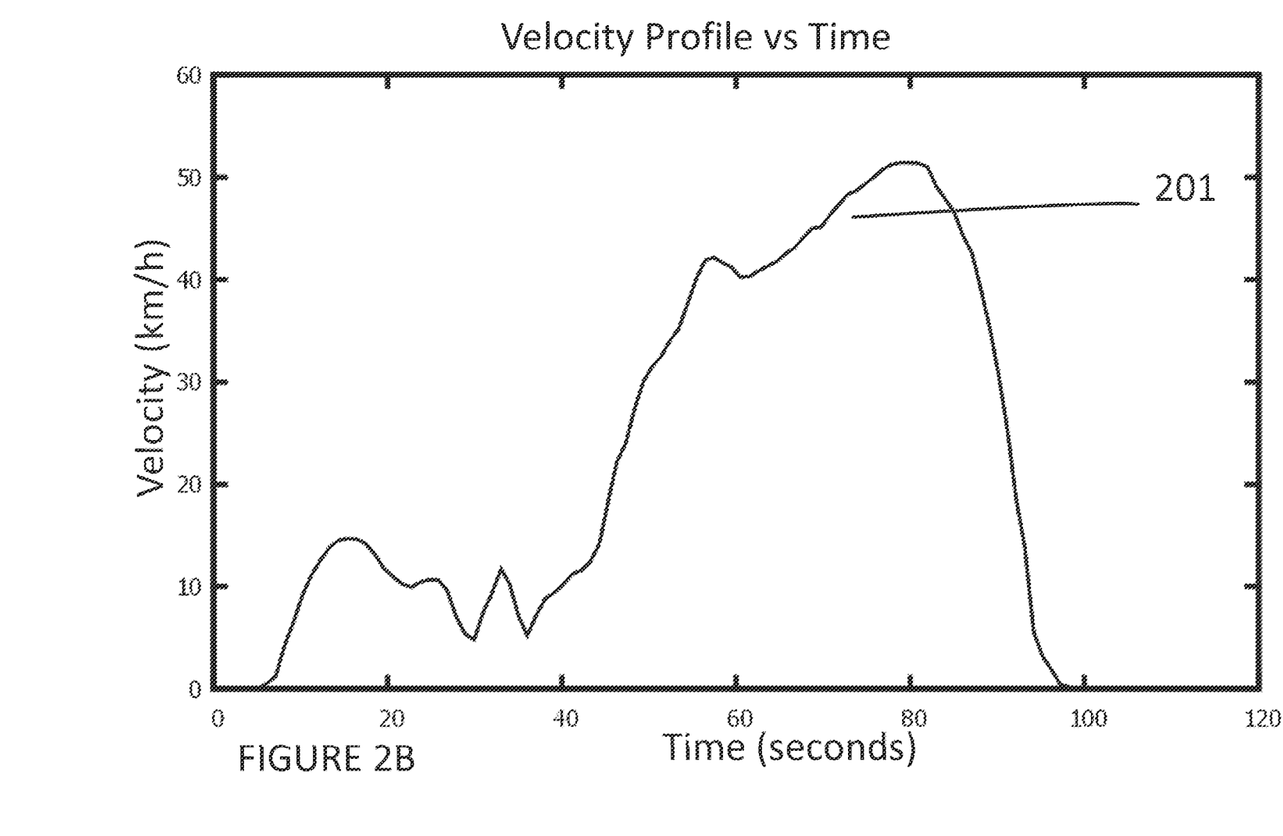
FIG. 2B graphically illustrates a close-up of a typical electric drive schedule, for purpose of illustrating the embodiment.

FIGS. 2A and 2B graphically illustrate a typical drive schedule plot of vehicle velocity verses time. Drive schedules are used to characterize vehicle performance with respect to fuel economy, emissions, range, acceleration and other performance criteria. The figure shown with a 2300 second duration is similar to an inner city drive cycle that a typical heavy duty transit bus would repeat regularly in revenue service operation. The cycle may be repeated many times in the course of a daily single operating shift. FIG. 2B graphically illustrates a close-up of a typical electric drive schedule, for purpose of illustrating the embodiment.

Figure 3:
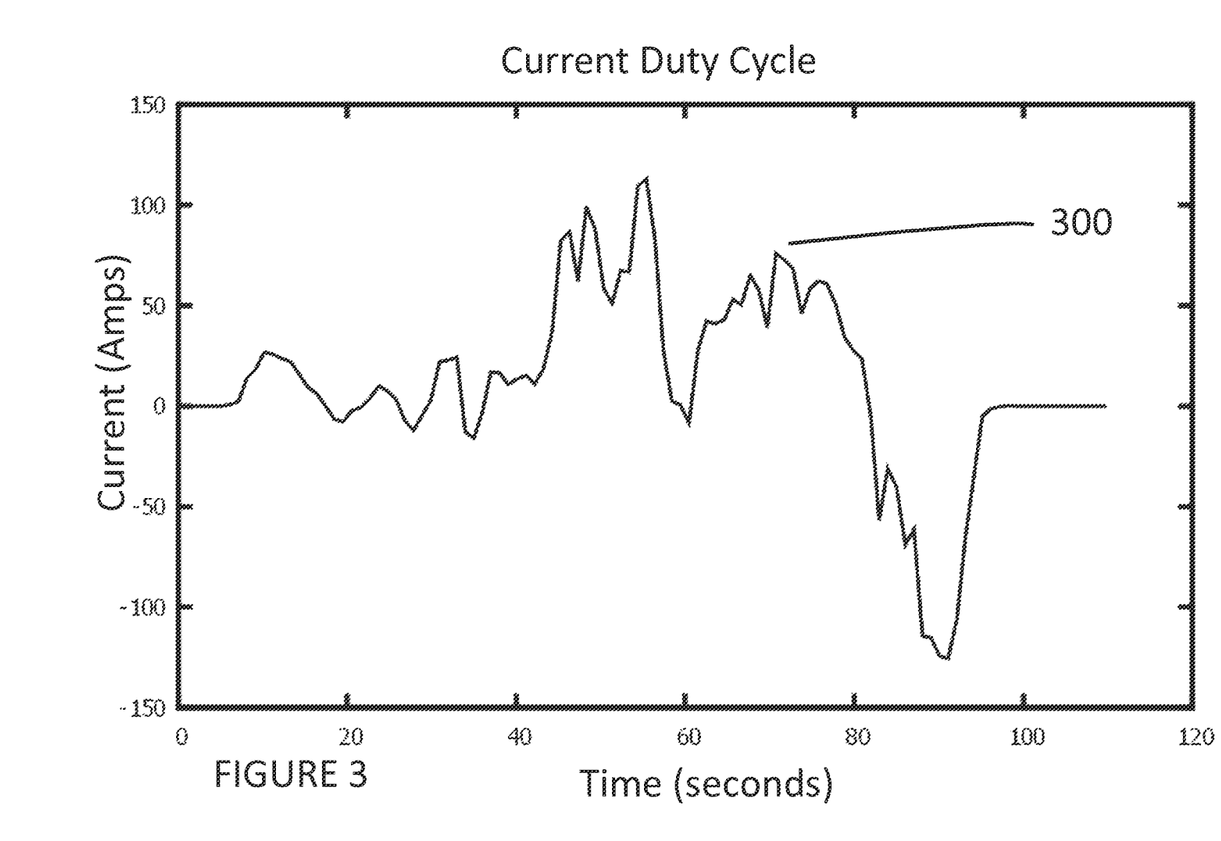
FIG. 3 graphically depicts the current duty cycle resulting from the aforementioned drive cycle.

FIG. 3 graphically depicts the current duty cycle resulting from the aforementioned drive cycle, otherwise known as an operating profile. FIG. 3 graphically shows an example plot of battery propulsion system current verses time for an electric heavy duty vehicle in response to the drive schedule FIG. 2B, as determined by numerical simulation. The operating profile is an input signal into the embodiment, and is generated by the overall system controller in response to the drive system duty cycle in use. In order to provide the power required to move the electric vehicle in a typical drive schedule, the electric vehicle' propulsion system will draw current from the energy storage system at a rate that correlates with the drive schedule. The amount of current and rate of current that the motors draw form the battery, or put back into the battery during energy recuperation may be a function of the propulsion system characteristics, drive schedule, operating environment, vehicle parameters such a weight, rolling resistance, air resistance to name a few. Duty cycles from grid utilities load cycles that can also be represented in a time varying manner.

Figure 4:
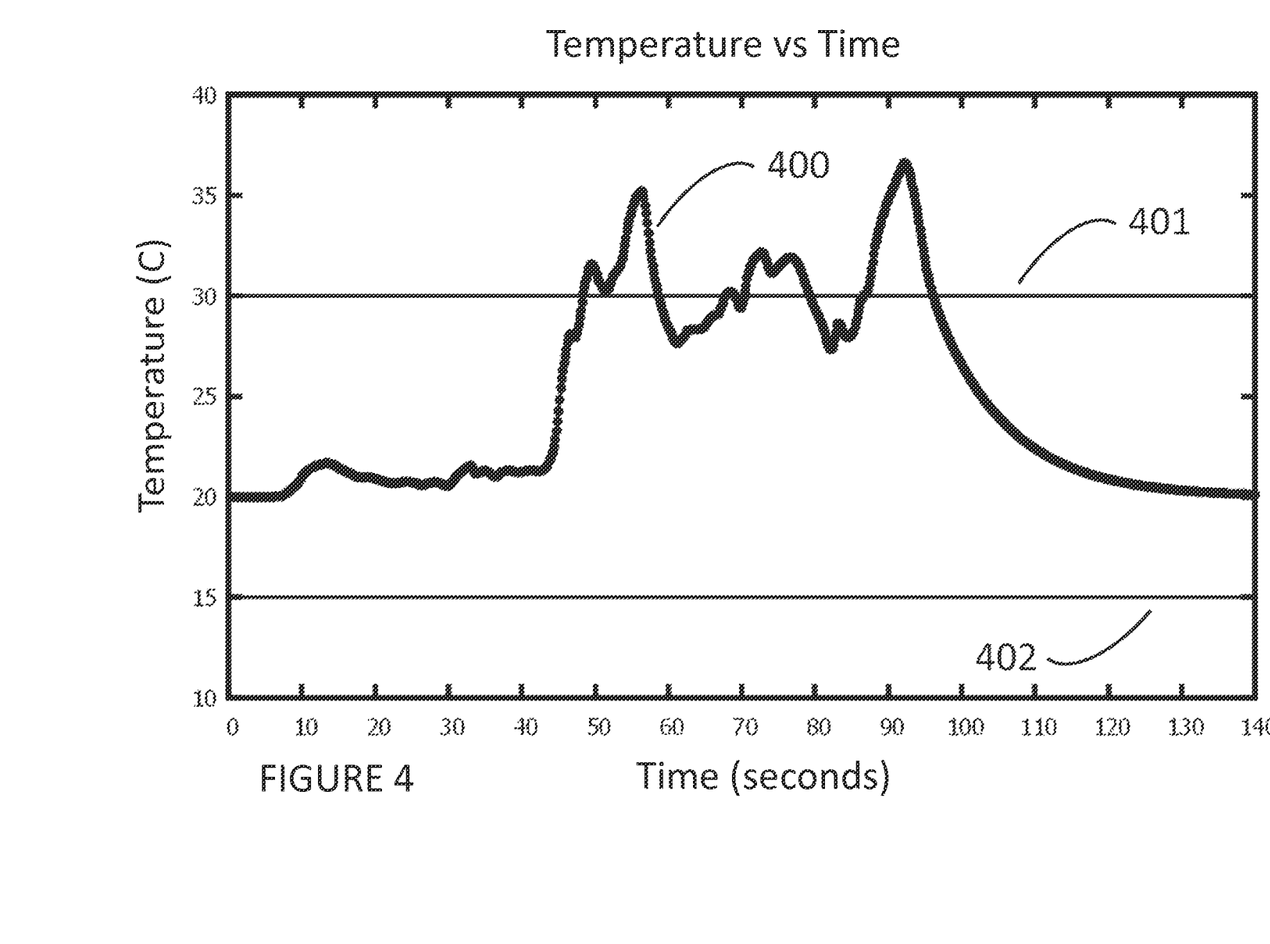
FIG. 4 graphically illustrates the temperature profile of a cell or module without temperature control.

FIG. 4 illustrates the temperature rise as a function of time of a battery cell in a battery pack as determined by numerical simulation by solving a partial differential heat equation parameterized with thermal characteristics and geometry of a cell and its supporting structure. The cell support structure inside a battery module is thermally conductive and provides a path for heat rejection media such as a thermal cooling fluid of the system in FIG. 1. The current duty cycle of FIG. 3 (300) is the input to the numerical model of the cell. The average temperature response (400) is shown in FIG. 4, which illustrates the effect allowing the regulating temperature to be equivalent to the ambient temperature of 20 degrees C., in the present example. In response to the current duty cycle, the cell temperature profile rises above the safe operating window of 30 degrees C. In the figure, the temperature of the cell is allowed to fluctuate without active cooling, allowing heat to dissipate to the environment. In this example the temperature profile (400) exceeds the recommended operating limits of the cell which, in this example, is between 30 and 15 degrees C., as depicted by the horizontal lines (401) and (402).

Figure 5:
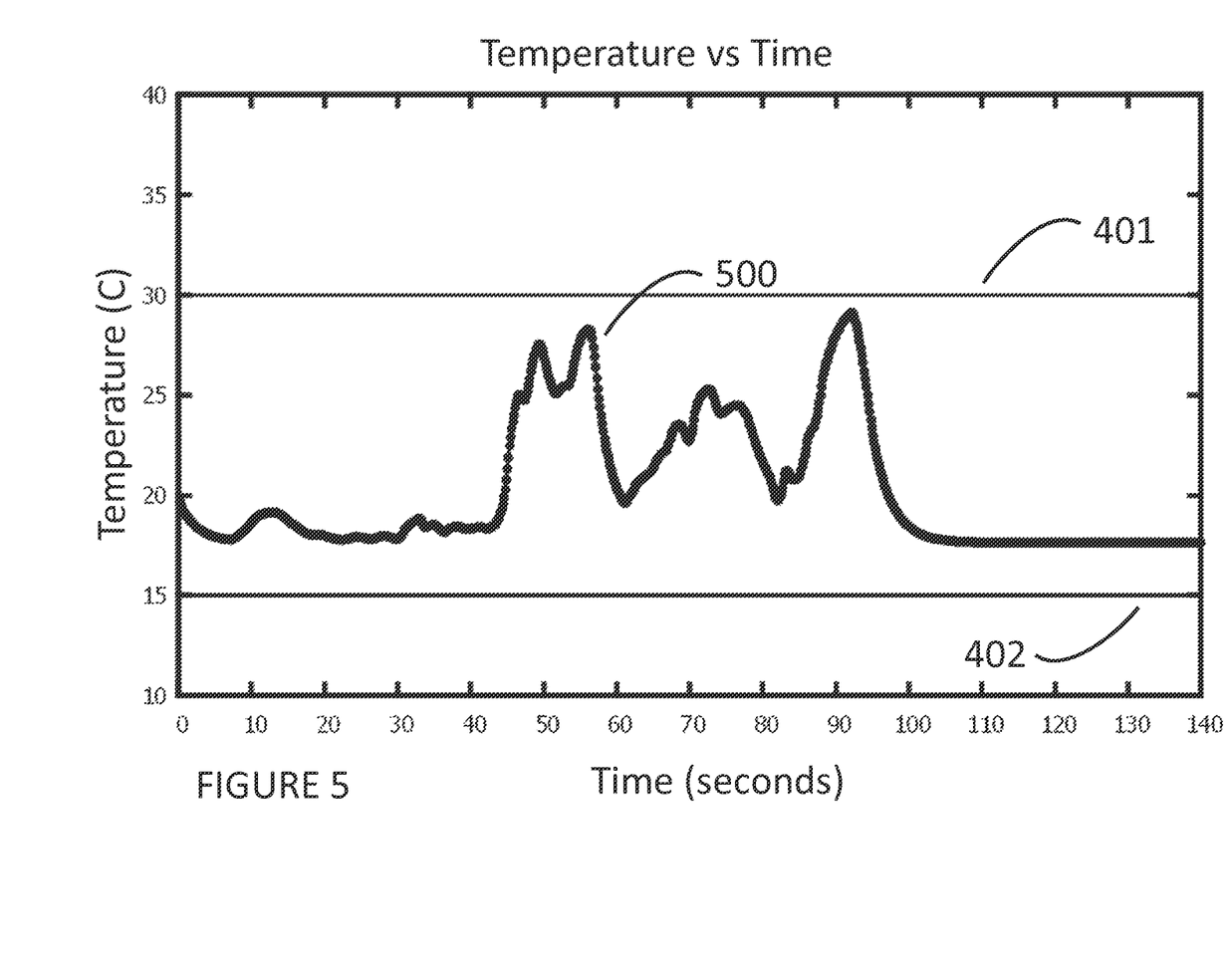
FIG. 5 graphically illustrates the temperature profile of a cell or module with temperature control system at maximum setpoint of 15 degrees C.

FIG. 5 demonstrates the effect of setting the cooling system to the lowest setpoint of 15 degrees C. The average cell temperature (500) is now within the prescribed optimal temperature range of 15 to 30 degrees C. at the expense of commanding the HVAC system to operate at a high duty cycle and thus consuming a maximum amount of energy from the vehicle battery pack which limits the range.

Figure 6:
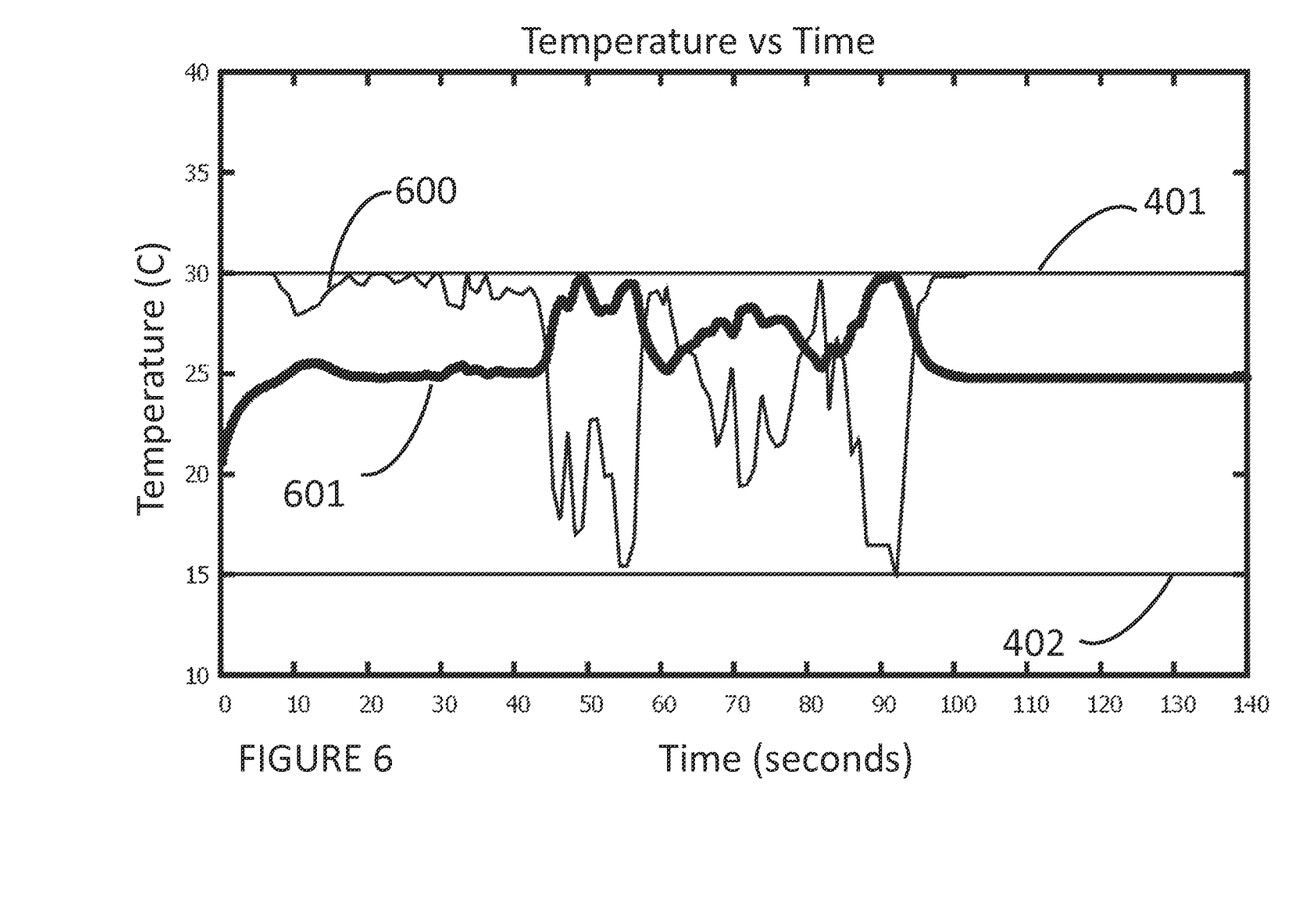
FIG. 6 graphically illustrates the temperature profile of a cell or module as regulated by an embodiment.

FIG. 6 demonstrates an embodiment where the temperature response of the battery cell (700) is dynamically and adaptively thermally managed by the embodiment.

Figure 7A:
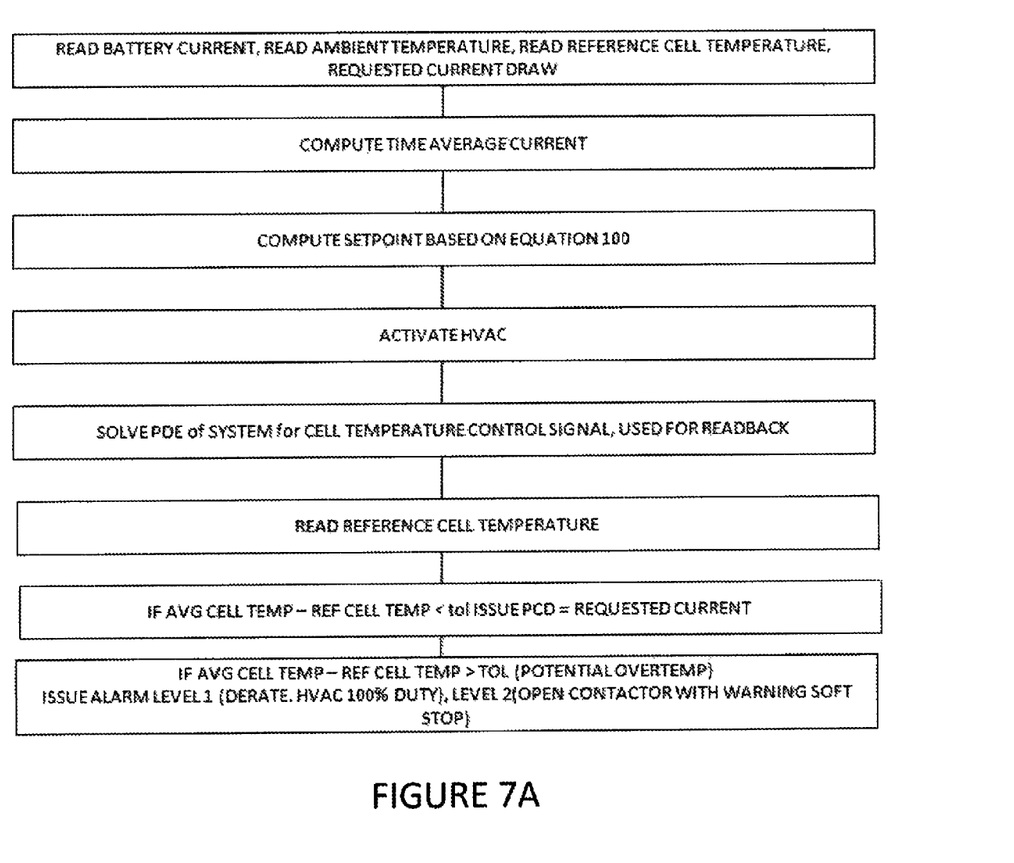
FIG. 7A illustrates the process to dynamically manage heat in an electric energy storage system.

FIG. 7A illustrates a process to dynamically manage heat in an electric energy storage system. In such an embodiment, the embodiment reads battery current, ambient temperature, reference cell temperature, and requested current draw. The time average current is computed. The setpoint is calculated. The HVAC system is activated. The partial differential equation of system for cell temperature control signal is solved, and used for read back. The reference cell temperature is read. If the average cell temperature−reference cell temperature is less than the tol, issue PCD=Requested current. If the average cell temperature−reference cell temperature is greater than the tol, there is potential over temperature, issue an alarm level 1 (rate. HVAC 100% duty), level 2 (open contactor with warning soft stop).

Figure 7B:
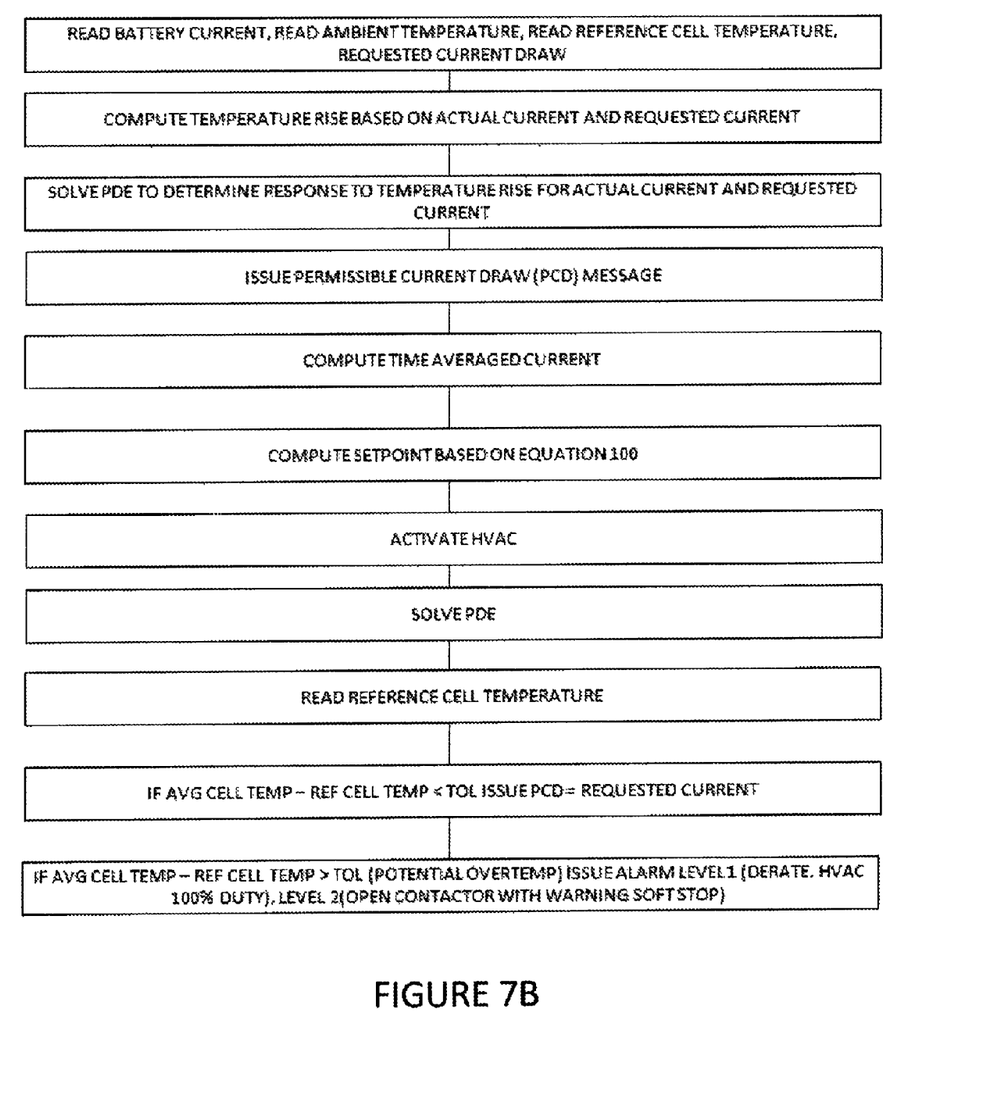
FIG. 7B illustrates the process another embodiment to dynamically manage heat in an electric energy storage system.

FIG. 7B illustrates another process to dynamically manage heat in an electric energy storage system. In such an embodiment, the embodiment reads battery current, ambient temperature, reference cell temperature, and requested current draw. The partial differential equation to determine response to temperature rise for actual current and requested current is solved. The system issues a permissible current draw (PCD) message. The time average current is computed. The setpoint is calculated. The HVAC system is activated. The partial differential equation of system for cell temperature control signal is solved, and used for read back. The reference cell temperature is read. If the average cell temperature−reference cell temperature is less than the tol, issue PCD=Requested current. If the average cell temperature−reference cell temperature is greater than the tol, there is potential over temperature, issue an alarm level 1 (rate. HVAC 100% duty), level 2 (open contactor with warning soft stop).

Figure 8:
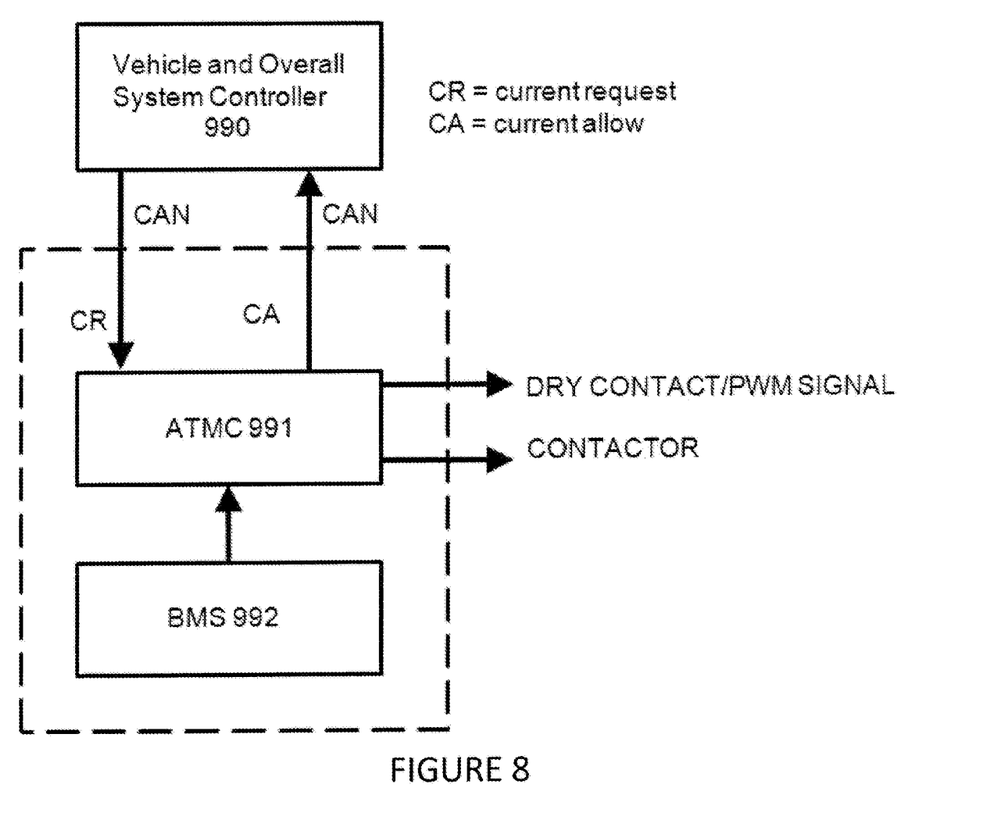
FIG. 8 illustrates an alternate embodiment to dynamically manage heat in an electric energy storage system.

FIG. 8 illustrates an alternate embodiment to dynamically manage heat in an electric energy storage system. In this embodiment, the vehicle and overall system controller communicates with ATMC 991, and BMS 992 provides input to ATMC 991.

Figure 9:
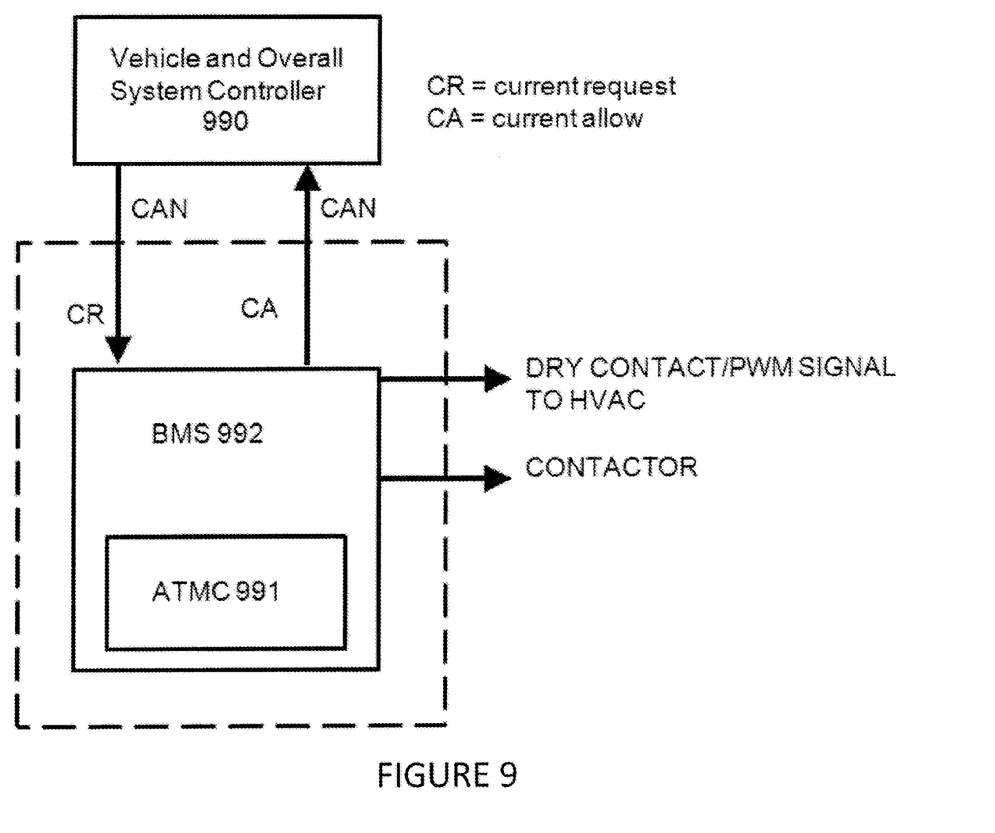
FIG. 9 illustrates an alternate embodiment to dynamically manage heat in an electric energy storage system.

FIG. 9 illustrates an alternate embodiment to dynamically manage heat in an electric energy storage system. In this embodiment, the vehicle and overall system controller communicates with BMS 992, which includes ATMC 991.

Figure 10:
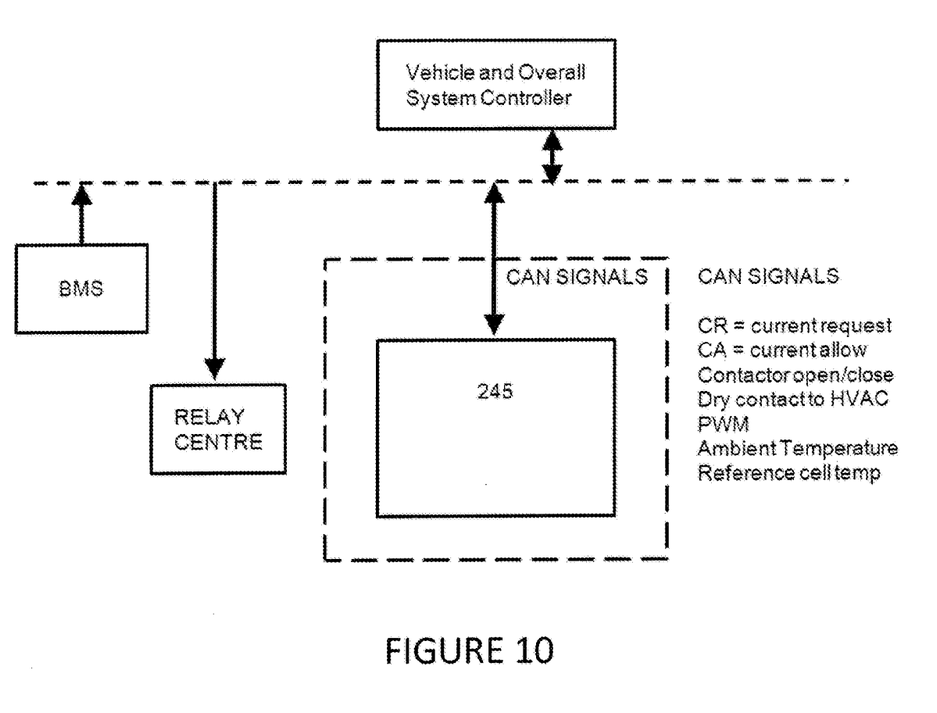
FIG. 10 illustrates another embodiment to dynamically manage heat in an electric energy storage system.

FIG. 10 illustrates another embodiment to dynamically manage heat in an electric energy storage system. In this embodiment, the vehicle and overall system controller communicates with the system along a bus.

It is understood by those familiar with the art that the system described herein may be implemented in hardware, firmware, or software encoded on a non-transitory computer-readable storage medium.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A thermally managed energy storage system for an electric vehicle, the electric vehicle including an overall system controller of the electric vehicle, the thermally managed energy storage system for the electric vehicle comprising:
an electric energy storage system including at least one energy storage module having a plurality of energy storage cells, the electric energy storage system configured to electrically couple to and power an electric load of the electric vehicle;
a plurality of thermal sensors configured to determine a cell temperature of at least one of the plurality of energy storage cells;
a thermal management system for regulation of operating temperature of the at least one cell within limits prescribed by a battery manufacturer, the thermal management system including a heat exchanger, a pump, and a pipe system fluidly coupled together as a closed thermal loop, the thermal management system configured to thermally condition the plurality of energy storage cells by circulating a fluid through the electric energy storage system, in response to a thermal control signal; and
a thermal management control unit configured
to receive an input signal indicative of current being supplied from the electric energy storage system to the electric load,
to receive an input signal indicative of a cell temperature of the at least one cell, the cell temperature to be used in operation of the thermal management system,
to receive an input signal indicative of ambient temperature in which the electric energy storage system is operated for operation of the thermal management system,
to receive an input signal from a vehicle control device, the input signal from the vehicle control device including a request for current to be supplied from the electric energy storage system at a specific time, at a specified current,
to output to the overall system controller of the electric vehicle a signal representing an allowable current to be supplied from the electric energy storage system to the electric load,
to compute an averaged current from the energy storage system,
to compute a partial differential transient heat equation for the generation of cell temperature control signals, and
to issue a command to the overall system controller of the electric vehicle to heat or cool the electric energy storage system via the thermal management system, and responsive to the averaged current from the energy storage system, and the partial differential transient heat equation for the generation of cell temperature control signals.

2. The thermally managed energy storage system of claim 1, wherein the input and output signals are discrete.

3. The thermally managed energy storage system of claim 2, wherein the thermally managed energy storage system is connectable to an existing communication control network without modification of other devices on that control network.

4. The thermally managed energy storage system of claim 1, further comprising a storage device to store a computed value to be used in calculating a temperature setpoint.

5. The thermally managed energy storage system of claim 1, further comprising an actuator in the form of a dry contact, a PWM signal generator, or a relay center, which interfaces to a vehicle HVAC system and is configured to command the vehicle HVAC system.

6. The thermally managed energy storage system of claim 1, wherein the temperature setpoint is determined by the control expression $$\text{t\_set\_point} = \text{t\_setpoint\_max} - M^*((I\_AVG^*\alpha + (1-\alpha)^*I\_CDR)^2 * R\_\text{internal}/(A^*(I\_AVG^*\alpha + (1-\alpha)^*I\_CDR)^B * \text{Acell}))$$

where,
t_set_point is the temperature setpoint;
t_setpoint_max is a maximum setpoint of the vehicle HVAC system;
M is a parameter determined by a mapping function that maps an allowable temperature rise between the maximum and minimum temperature set points;
I_AVG is an average current of a battery duty cycle;

I_CDR is a requested current;
α is a weight parameter;
R_internal is battery internal resistance;
A is a cross sectional area of a battery cell; and,
B is a width of the battery cell.

7. The thermally managed energy storage system of claim 6, wherein the mapping function includes a linear function.

8. The thermally managed energy storage system of claim 6, wherein the mapping function includes a higher order polynomial function.

9. The thermally managed energy storage system of claim 6, wherein I_AVG is computed using a time average value of actual current the electrical energy storage system is delivering over a tunable preset time interval.

10. The thermally managed energy storage system of claim 6, wherein the function in the form of $K\alpha+(1-\alpha)K$ is used to weight the average current and the requested current to compute a weighted average current with weight α, such that α is a number between 0 and 1.

11. The thermally managed energy storage system of claim 10, wherein α is a function of the energy storage state of charge or $\alpha=1-SOC$.

12. The thermally managed energy storage system of claim 6, wherein temperature rise for generating time dependent boundary conditions for a 1-dimensional numerical model of a battery and cell and surrounding structure is given by a temperature rise relation $I^2R/AI^B Acell$, where I(t) @ t=t+dt is found by interpolation between current request points I(t) @ t=t and I(t) @ t=t+dt.

13. The thermally managed energy storage system of claim 12, wherein a one dimensional time dependent partial differential heat equation is numerically solved to obtain a virtual average cell temperature using a 1-dimensional model of the cell, thus reducing the number of required sensors in a battery array.

14. The thermally managed energy storage system of claim 13, wherein a partial differential equation solution is compared with T_Actual to determine cells are within temperature limits, and issue a current rate to some pre-set value determine by the invention.

15. The thermally managed energy storage system of claim 14, wherein tcell and tpde are compared to determine SOH as time progresses, issuing a diagnostic message if the difference grows beyond bound.

16. The thermally managed energy storage system of claim 15, wherein the energy storage system and thermal management system are included in the electric vehicle.

17. The thermally managed energy storage system of claim 16, wherein the thermal management control unit is included in the overall system controller of the electric vehicle.

18. The thermally managed energy storage system of claim 16, wherein the thermal management control unit is a standalone device but included in the electric vehicle.

19. The thermally managed energy storage system of claim 16, wherein the thermal management control unit includes a high performance numerical computation unit.

* * * * *